US011104504B1

(12) United States Patent
Solberg

(10) Patent No.: US 11,104,504 B1
(45) Date of Patent: Aug. 31, 2021

(54) REMOTE CONTROLLED ATTRACTANT OR REPELLENT DISPERSING APPARATUS

(71) Applicant: Kory Solberg, Gonvick, MN (US)

(72) Inventor: Kory Solberg, Gonvick, MN (US)

( * ) Notice: Subject to any disclaimer, the term of this patent is extended or adjusted under 35 U.S.C. 154(b) by 0 days.

(21) Appl. No.: 15/729,274

(22) Filed: Oct. 10, 2017

Related U.S. Application Data

(60) Provisional application No. 62/409,136, filed on Oct. 17, 2016.

(51) Int. Cl.
| | |
|---|---|
| *B67D 7/06* | (2010.01) |
| *B65D 83/26* | (2006.01) |
| *B65D 83/72* | (2006.01) |
| *A01M 29/12* | (2011.01) |
| *A01M 31/00* | (2006.01) |
| *B65D 83/38* | (2006.01) |

(52) U.S. Cl.
CPC ........... *B65D 83/267* (2013.01); *A01M 29/12* (2013.01); *A01M 31/008* (2013.01); *B65D 83/384* (2013.01); *B65D 83/72* (2013.01)

(58) Field of Classification Search
CPC .... B65D 83/267; B65D 83/72; B65D 83/384; B65D 83/262; A01M 29/12; A01M 31/008; A01M 1/2038; B67D 3/0003; B05C 5/02
USPC ........................ 222/146.3, 173, 504, 192, 63, 222/181.1–181.3, 182, 183, 185.1; 43/1, 43/129
See application file for complete search history.

(56) References Cited

U.S. PATENT DOCUMENTS

| | | | |
|---|---|---|---|
| 4,024,990 A | 5/1977 | Smrt | |
| 4,171,776 A | 10/1979 | Pagliaro | |
| 4,660,745 A | 4/1987 | Hess, Jr. | |
| 6,039,212 A * | 3/2000 | Singh | B65D 83/262 222/30 |
| 6,293,442 B1 | 9/2001 | Mollayan | |
| 6,318,600 B1 | 11/2001 | Winnett et al. | |
| 6,663,307 B2 | 12/2003 | Kopanic et al. | |
| 6,785,911 B1 | 9/2004 | Percher | |
| 6,966,461 B2 | 11/2005 | Warner et al. | |
| 6,983,103 B1 * | 1/2006 | Parcher | A01M 31/004 222/146.5 |
| 7,686,193 B1 | 3/2010 | Gervais et al. | |
| 7,717,300 B1 | 5/2010 | Yarrusso, Jr. | |

(Continued)

FOREIGN PATENT DOCUMENTS

WO    03024837 A1    3/2003

*Primary Examiner* — Vishal Pancholi
*Assistant Examiner* — Robert K Nichols, II
(74) *Attorney, Agent, or Firm* — Peter J. Ims; Westman, Champlin & Koehler, P.A.

(57) ABSTRACT

A remotely controlled attractant or repellent dispersing apparatus housing a remotely controlled actuator system where an aerosol spray can is mountable for engagement with the actuator system. A receiver in communication with a transmitter is configured to receive one or more commands from the transmitter and relay the command to the actuator system for opening and/or closing a valve on the spray can for dispersing the contents of the aerosol can at selected times and for selected durations. The dispersing system is mountable in an outdoor environment and the transmitter is a hand-held remote control. A removable base support is provided to retain aerosol spray cans of different sizes in alignment with the actuator system.

17 Claims, 6 Drawing Sheets

(56) References Cited

U.S. PATENT DOCUMENTS

| | | | |
|---|---|---|---|
| 7,785,541 B1 * | 8/2010 | Fiorello | A01M 1/2038 422/124 |
| 8,206,697 B1 | 6/2012 | Schmidt | |
| 2005/0029311 A1 | 2/2005 | Bostick | |
| 2006/0071036 A1 | 4/2006 | Gervais | |
| 2010/0063640 A1 * | 3/2010 | Olmstead | A01M 1/2038 700/283 |
| 2010/0096409 A1 * | 4/2010 | Wainwright | A01M 1/2038 222/181.2 |
| 2011/0266999 A1 * | 11/2011 | Yodfat | A61M 5/1413 320/107 |
| 2015/0284178 A1 | 10/2015 | Bellinger et al. | |
| 2017/0283158 A1 * | 10/2017 | Schulz | B65D 83/0055 |
| 2018/0087254 A1 * | 3/2018 | Lloyd | E03D 9/002 |

\* cited by examiner

REMOTE CONTROLLED ATTRACTANT OR REPELLENT DISPERSING APPARATUS

CROSS-REFERENCE TO RELATED APPLICATIONS

This application claims priority to and the benefit of U.S. provisional patent application Ser. No. 62/409,136, filed on Oct. 17, 2016, the contents of which are incorporated herein in its entirety.

BACKGROUND

The present disclosure relates to the field of attractant or repellent dispersing apparatuses. More specifically, the present disclosure relates to an apparatus for remotely selecting and controlling the timing and duration of dispersion of animal or insect attractant or repellent from an aerosol-type spray can.

Deer attractants can be provided in forms including solid blocks, food supplies, and aerosol spray cans. With respect to aerosol spray cans, the aerosol is dispersed in a selected location to attract deer.

Hunters attempt to remain out of sight of the deer population during hunting season by utilizing a deer stand or hunting in a location a distance away from a suspected location where deer congregate. When using deer attractants, hunters generally must enter the selected hunting ground and disperse or set out the attractant. Deer in the vicinity may see the hunter deploying the attractant and avoid that area or otherwise be scared off.

Repellents are generally spayed to discourage a pest such as animal or insects from entering an area or space. When repellents are sprayed, the pest is generally already present and the user must expose themselves to the pests prior to dispersing the repellent.

SUMMARY

An aspect of the present disclosure relates to a remote controlled apparatus for dispersing attractant or repellent from a container having a spray valve. The apparatus comprises a housing and an actuator system secured to the housing. A receiver is in communication the actuator system, where signals from the receiver cause the actuator to move, which in turn causes the valve to open or shut. The apparatus further comprises a battery powered hand-held remote control device and the receiver is configured to receive commands from the hand-held remote control.

The apparatus may further comprise a battery powered heater to maintain the attractant or repellent above a freezing temperature of the attractant or repellent.

The actuator system may comprise an actuator configured to directly move the valve of the container for opening or closing the valve. Optionally, the actuator system may further comprise a lever operably connected to the actuator for causing the valve to open or shut. Addition of the lever to the actuator system provides a mechanical advantage to the actuator system and reduces the power needed by the actuator to open or close the valve.

The housing is configured to also receive a removable base support. The base support is configured to hold aerosol spray cans of one or more sizes in alignment with the actuator system. The base support restricts vertical and lateral movement of the attractant or repellent container. The base support has a vertically positioned support and an upper base surface comprising a first horizontal surface and a second horizontal surface for supporting containers of different sizes. The first horizontal surface and the second horizontal surface are positioned at different vertical heights with respect to a bottom base surface. The securing mechanism has a riser for supporting a smaller aerosol spray can in alignment with the actuator system.

Another aspect of the present disclosure relates to a method of remotely dispersing of an attractant or repellent in a controlled manner from a container. The method comprises positioning the container having the attractant or repellent there in a housing and securing the container within in the housing such that a valve of the container is aligned with an actuator system in the container. Transmitting a signal from a hand-held remote to a receiver positioned on the housing, where the receiver is in communication with the actuator system and manipulating the actuator system to open or close the valve on the container allows for dispersing the contents of the container. Selecting a time and duration for moving the actuator to remotely disperse the attractant or the repellent allows for doing so in a controlled manner.

Manipulating the actuator assembly may comprise moving an actuator to directly open or close the valve of the container, such that the actuator contacts the valve or housing of the valve. Alternatively, manipulating the actuator assembly comprises moving the actuator to move a lever operably connected to the actuator, where the lever opens or closes the valve of the container.

DETAILED DESCRIPTION

A remotely operated dispersing apparatus of the present disclosure is configured to disperse the contents of a container, such as an aerosol spray can, automatically at a selected time and for a selected duration. The dispersing apparatus is configured to receive a command for dispersing an aerosol propellant from the can, and to dispense the contents for the duration of the command. A user can dispense the entire contents of a can at one time, or a selected portion of the can at one time, or portions of the attractant or repellent within the container at various selected increments and durations. In one embodiment, the remote controlled dispersing system allows a user to initiate and/or continue the spraying of attractant or repellent from a distance. While the present disclosure is directed to an attractant for deer, the present disclosure is not limited to aerosol spray cans containing deer attractant and includes other attractants or repellents.

Figure 1:
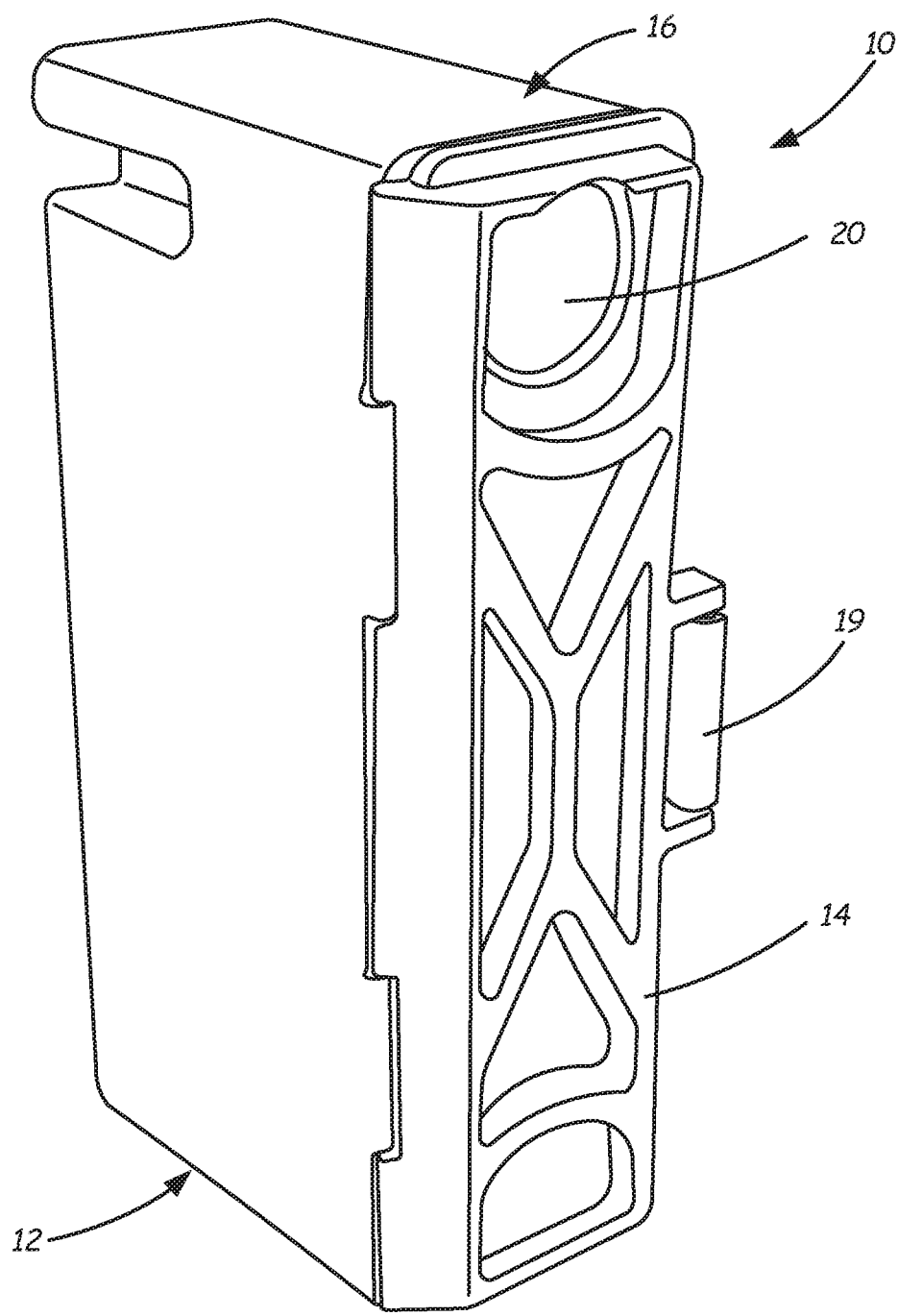
FIG. 1 is a front perspective view of a housing containing an automatic deer attractant dispersing apparatus.
Figure 2:
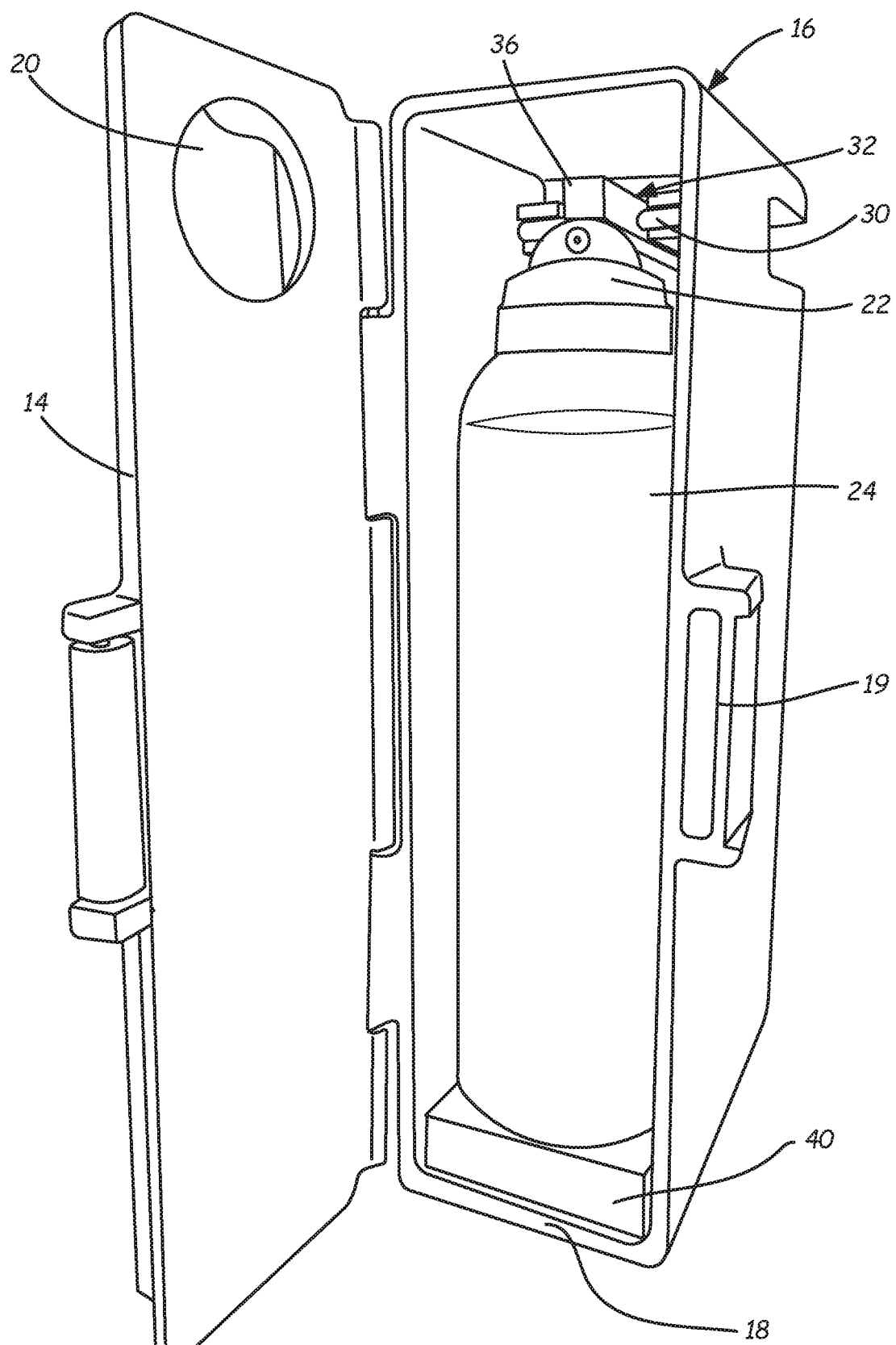
FIG. 2 is a front perspective view of the dispersing system within the housing.
Figure 3:
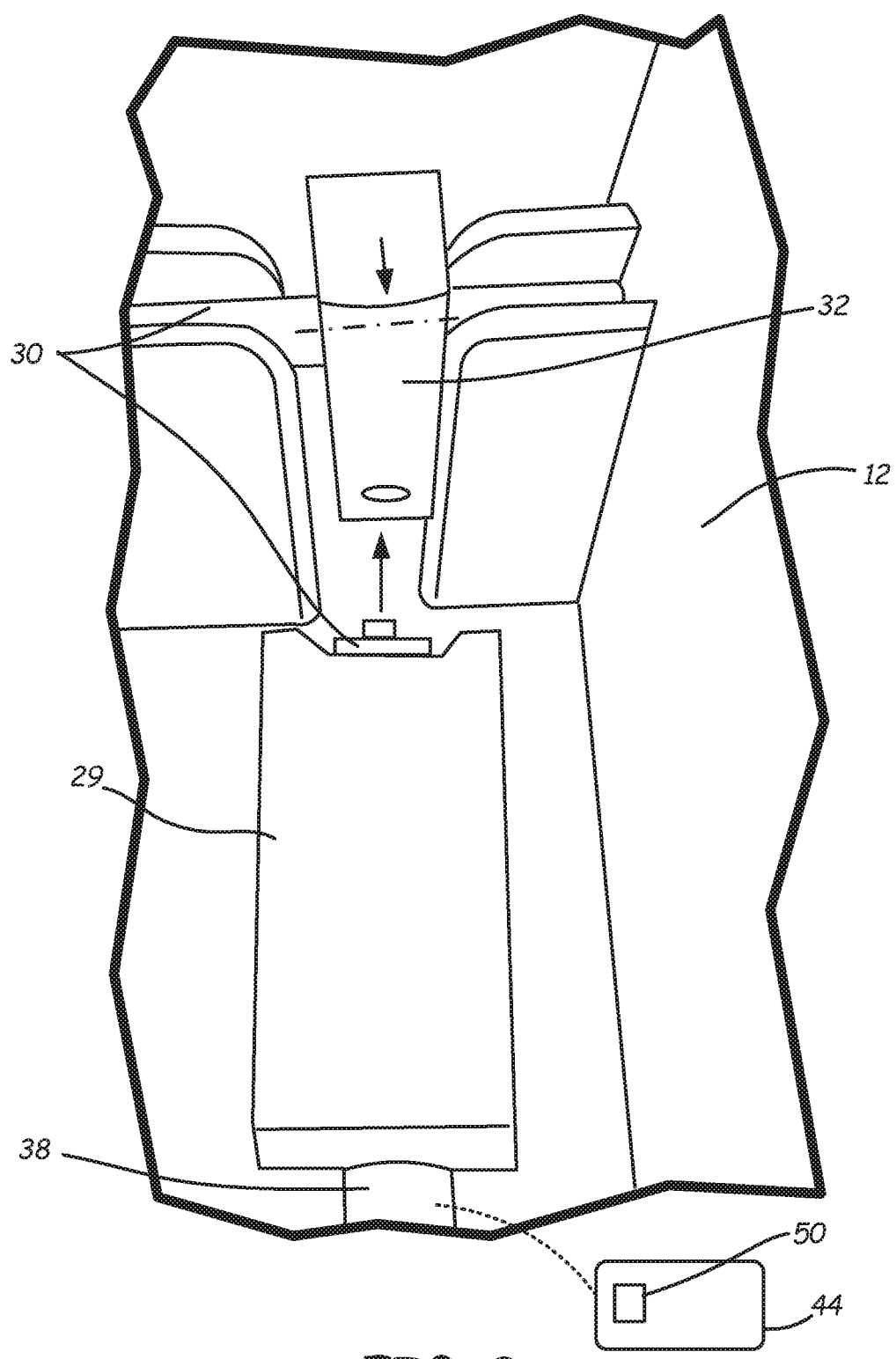
FIG. 3 is a front view of a spraying mechanism of the dispersing system.

A remote controlled deer scent dispersing apparatus is illustrated generally at 10 in FIGS. 1-3. Referring to FIG. 1, the apparatus 10 has a housing 12 for mounting to an outdoor structure or otherwise positioning outdoors. The housing 12 has a cover 14 and a main body 16 having a base 18. The housing 12 is configured to receive a container having the dispersant therein, such as an aerosol spray can 24. For example, the main body 16 may be separable from the cover 14 for accessing an inside of the housing 12.

In the embodiment illustrated, the cover 14 is pivotally attached to the main body 16 with one or more hinges 17 on one side of the main body 16, allowing for easy opening of the cover 14. The cover 14 is pivotally secured in a closed position to the main body 16 with a latch or closure 19 on an opposing side. The cover 14, hinges 17, and latch 19 allows the cover 14 to move and allow for easy access into the interior of the main body 16 for replacing the spray can 24 or otherwise accessing components within the housing 12.

The housing 12 includes at least one aperture 20, which provides an opening for the attractant to be dispersed from the spray can 24 into the ambient environment. In the embodiment illustrated, the aperture 20 is positioned on an upper portion of the cover 14. Alternatively, the aperture 20 may be positioned on another surface of the main body 16 to allow attractant to be dispersed from the main body 16. The aperture 20 is of a size sufficient to provide an adequate opening in the apparatus 10 for the dispersion of the contents of the spray can 24 from a nozzle of the aerosol spray can 24 without impediment from housing 12. For example, the aperture 20 is positioned about the nozzle of the spray can 24 as received inside the housing 12.

The housing 12 is constructed of a material that is capable of withstanding exposure to outdoor elements. Exemplary materials of construction include but are not limited to plastic, aluminum, steel or a like material. In an exemplary embodiment, the housing 12 is constructed of a molded plastic assembly including the main body 16, cover 14 and optionally a base support 40. The plastic may be a high-density polyethylene or similar strength material.

A remote controlled aerosol dispersing system 28 is positioned within the main body 16 of the housing 12 and is illustrated in FIGS. 2-3. For example, the dispersing system 28 is an actuator system 28. The actuator system is secured to an inner and/or upper surface of the main body 16. The system 28 includes a remote controlled electric actuator 30 for moving a valve of the spray can 24 for controlling the dispersion of contents therefrom. The system 28 may optionally further comprise a lever 32 operably connected to the actuator 30. In the embodiment illustrated, the actuator 30 is an electric linear actuator.

Where a lever 32 is used to provide mechanical advantage and thus reducing the size of the actuator 30 needed, an actuator engaging end 34 of the lever 32 may be operably connected to the actuator 30 which is then moved by operation of the actuator 30. The lever 32 also has a valve engaging end 36 opposing the actuator engaging end 34. The lever 32 extends from the operable connection with the actuator 30 to accommodate the aerosol spray can 24 and to provide a mechanical advantage when engaging the valve thereof.

When the aerosol spray can 24 is mounted in the apparatus 10, the valve engaging end 36 of the lever 32 is aligned above the depressible valve 22. As the actuator 30 displaces the opposing end 34 of the lever 32, the valve engaging end 36 of the lever 32 presses or releases the depressible valve 22 to open and close the depressible valve 22. The actuator 30 causes the valve engaging end 36 of the lever 32 to move. The actuator system is also powered by a battery 29 that is retained in or proximate the housing 12. For example, a 12V battery system can provide power to the actuator 30.

Figure 4:
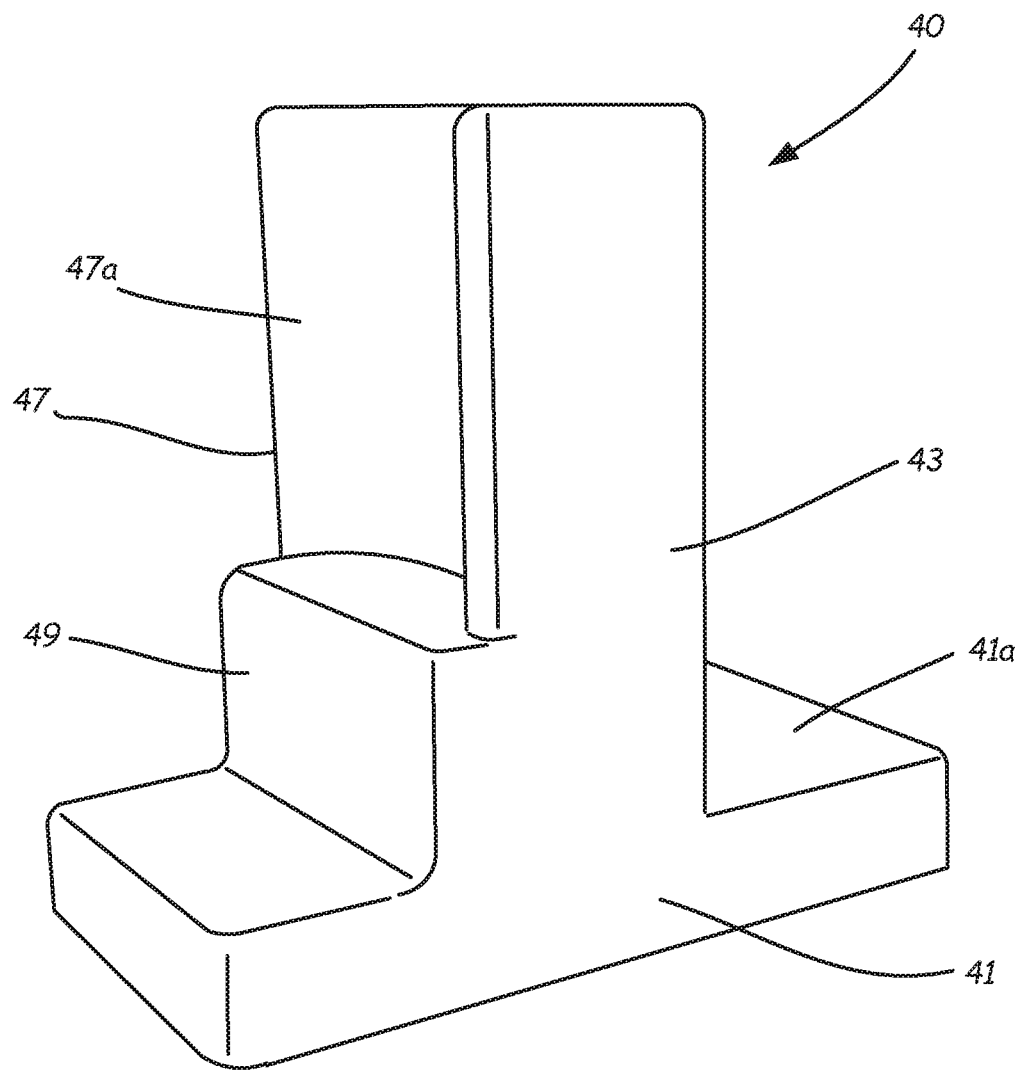
FIG. 4 is a front perspective view of a securing mechanism for the dispersing apparatus.
Figure 5:
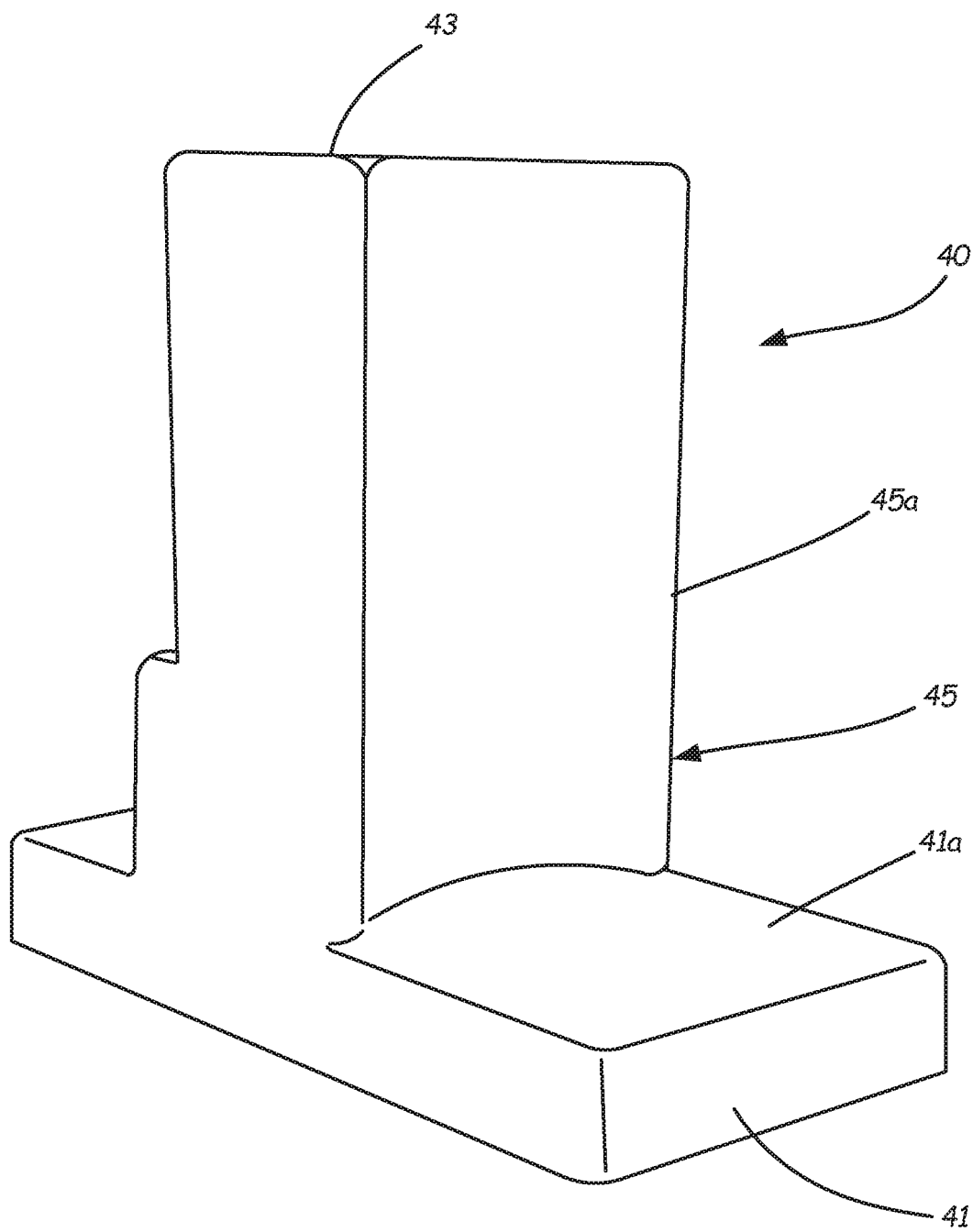
FIG. 5 is a rear perspective view of a securing mechanism for the dispersing apparatus.

Referring to FIGS. 4 and 5, the apparatus 10 includes a container securing mechanism, which for example, may be a removable aerosol spray can base support 40, which holds the spray can 24 within the housing 12. The main body 16 of the housing 12 is configured to receive the base support 40 therein. A base 41 of the base support 40 has dimensions allowing the base support 40 to fit within the main body 16 and be supported in an upright position by the floor 18 of the main body 16. The base support 40 allows aerosol spray cans of different sizes to be aligned with the actuator 30 of the device 10, such that the device 10 is operable with dispersant containers of different sizes.

Extending integrally upward from the base 41 is a center prong 43. This center prong 43 has two opposing surfaces 45 and 47. The opposing surfaces 45 and 47 extend vertically upward from the base 41 along the center prong 43. The opposing surfaces 45 and 47 comprise a first surface 45 and a second surface 47, which each have an arcuate concave surface 45a, 47a configured to abut a vertical length of a standard aerosol spray can 24 placed on the base support 40.

An upper surface 41a of the base 41 provides a base or floor for the first surface 45, which supports a bottom of the spray can 24 placed on the base support 40. A second base portion 49 is provided for the second surface 47, which supports a bottom of the spray can 24 placed in contact therewith. The second base portion 49 is a riser. The second base portion 49 is also positioned on an opposing side of the center prong 43 from the base 41. These bases 41 and 49 are positioned at different vertical distances from a bottom surface of the base support 40, and thus at different vertical distances from the actuator lever when the mechanism 40 is secured in the main body 16 and supported by the floor 18. Both the base 41 and the riser 49 are configured to support a bottom surface of spray cans of different sizes to hold the respective spray can in place when downward pressure is applied to the spray nozzle portion of the spray can.

In the embodiment where a spray can 24 is larger, the spray can 24 may be supported in the main body 16 without the need for the base support 40. The securing mechanism prevents vertical movement of the aerosol can 24 when the actuator system moves the valve. This may comprise the actuator itself moving the valve by contact or the lever 32 depressing the valve 22 in the nozzle of the aerosol can 24.

The securing mechanism allows the user to select the dispersant of different types or in different size spray cans. The securing mechanism may additionally or alternatively comprise a retaining mechanism such as a strap, bracket or other mechanism which retains the spray can in alignment with the actuator 30. In an embodiment not illustrated, the securing mechanism may be an elongated "L" shaped bracket having a floor 42. The bracket 40 may be used to further secure and/or support the dispersing system 28 inside the housing 12. The floor 42 then supports the base end 25 of the aerosol can 24. When the actuator 30 displaces the lever 32 to depress the valve 22, the aerosol can 24 is vertically secured by the floor 42.

Additionally or alternatively, a clamp may be secured to a length of bracket and configured to clamp a portion of the can 24 along its length. A clamp provides an adjustable vertical securing mechanism for aerosol cans of different heights and sizes. Aerosol cans of different sizes can be received by the apparatus 10 and clamped in position such that the lever 32 can be displaced to depress a corresponding valve on different size cans 24.

The apparatus 10 includes a receiver 38 in communication the actuator 30, where signals from the receiver 38 cause the actuator system to initiate the actuator 30 to open or close the valve. This may optionally include the actuator 30 moving the lever 32, which in turn causes the valve 22 to open or shut. The receiver 38 is configured to receive commands from a hand-held remote control 44 that is powered by a dry cell battery 52. The receiver 38 may be positioned on or within the housing 12. As illustrated in FIG. 2, the receiver 38 is mounted on the housing 12. The remote control 44 includes at least one push-button mechanism 50 for initiating and sending signals to the receiver 38. Pressing and/or holding the push-button 50 provides signals to the receiver 38, which are then sent to the actuator system. Holding down the push-button 50 provides a signal from the remote control 44 to the receiver 38 for continuous activation and dispersion of the attractant while the push-button 50 is depressed. The remote control 44 provides the user with the ability to select the timing and the duration of the dispersion of attractant by pressing and/or holding down the push-button 50.

In the embodiment where the lever 32 is removed, the actuator 30 is positioned over the space where the depressible valve 22 is positioned within the housing. The actuator 30 is positioned approximately where the valve engaging end 36 of the lever 32 would be positioned such that the actuator 30 itself engages with the valve 22. A pad, such as a rubber pad or rubber band, or similar device is secured to the can 24 and positioned between the top of the valve 22 and the actuator 30. The rubber band is secured around the length of the can 24. Thus, the width of the rubber band covers the valve 22 and covers a portion of the base end of the can 25.

Thus, in this embodiment, the signals from the receiver 38 cause the actuator 30 to depress the valve 22 directly as only a buffer, such as the rubber band is positioned between the actuator and the valve 22.

Figure 6:
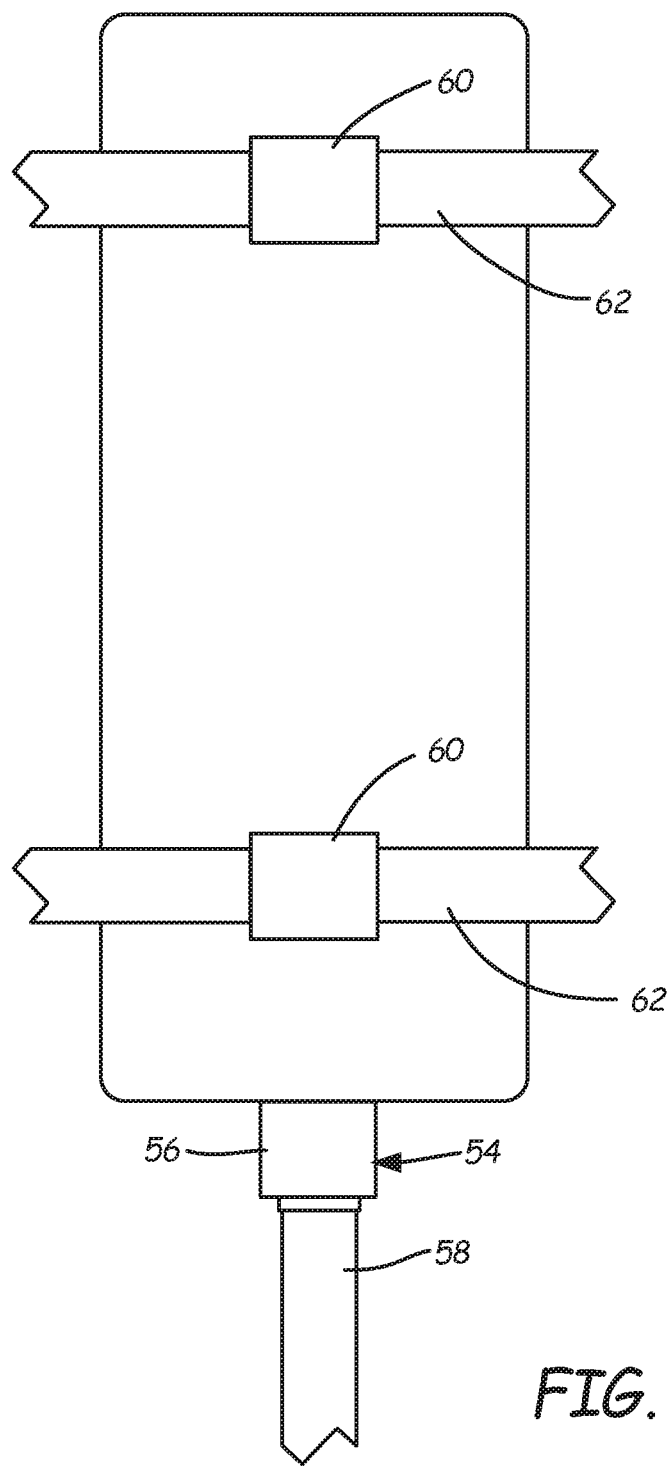
FIG. 6 is a back view of the housing.

The housing 12 is configured for being secured to a tree or other outdoor structure. The main body may be adapted with a mounting or fastening mechanism 54 which allows the housing 12 to be mounted to a pre-existing structure. As illustrated in FIG. 6, the mounting or fastening mechanism 54 may comprise a coupling 56 having internal threads for mating with an externally threaded end of a mounting post or a telescoping mounting pole 58. The post or pole may then be engaged with a ground surface or directly with the pre-existing structure (such as a tree) for positioning or repositioning the apparatus 10 in a selected outdoor environment. Additionally, or alternatively, the mounting or fastening mechanism 54 may comprise one or more slots 60 on the housing 12 which are configured to receive a strap 62 there through. The strap is then directly securable around the body of the pre-existing structure at a selected height and/or position. The housing 12 protects the system components positioned therein from the outside environment and also provides a camouflaging effect for the apparatus.

Given the lower temperatures outside during hunting season, the housing may also be adapted with a temperature control mechanisms so as to prevent damage to the aerosol can 24 or nozzle 22, prevent the freezing of the attractant, and to maintain the dispersing components in operable condition. The housing 12 can optionally include an electric powered heater 46 to prevent the attractant from freezing within the can 24. For example, a resistive heating element may be incorporated into the housing and positioned in thermal contact with the housing 12, lever 32 and/or the aerosol can 24 itself. The resistive heating element may be powered by the battery 29 for the dispersing system 28 or an additional battery source. The receiver 38 may also be in communication the heating element 46 where signals from the receiver 38 cause the electric heating element 46 to activate or deactivate. The receiver 38 is then configured to receive commands from the hand-held remote control 44 for heating the apparatus 10 such that the electric heating element 46 is remote controlled.

Although the present disclosure has been described with reference to preferred embodiments, workers skilled in the art will recognize that changes may be made in form and detail without departing from the spirit and scope of the disclosure.

The invention claimed is:

1. A remote controlled apparatus for dispersing attractant or repellent from a first or second aerosol container, each container having a spray valve, the apparatus comprising:
   a housing;
   an actuator system secured to the housing, the actuator system comprising an actuator;
   a removable base support configured to be positioned within the housing, the base support comprising:
      a first upper surface configured to accent a bottom of a first aerosol container;
      a second upper surface a selected distance above the first surface, the second upper surface configured to accept a bottom of a second aerosol container, the first aerosol container having a height greater than the second aerosol container; and
      an upwardly extending member having opposing first and second concave surfaces, the first concave surface configured to abut a vertical surface of the first aerosol container and the second concave surface configured to abut a vertical surface of the second aerosol container, such that the actuator can be utilized with different sized aerosol containers;
   a receiver in communication with the actuator, where signals from the receiver cause the actuator to move, which in turn causes the spray valve to open or shut; and
   a battery powered hand-held remote control device configured to send signals to the receiver to move the actuator.

2. The apparatus of claim 1, wherein the actuator system further comprises a lever having a first end operably connected to the actuator and a second end operably connected to the spray valve and having a fulcrum between the first end and the second end such that a mechanical advantage is utilized to cause the spray valve to open or shut.

3. The apparatus of claim 1, wherein the removable base support has a vertically positioned support for preventing lateral movement of the container in at least one direction.

4. The apparatus of claim 1, wherein the housing further comprises a cover.

5. The apparatus of claim 4, wherein the cover has an aperture positioned about a nozzle of the spray valve to allow the attractant or repellent within the container to be dispersed from the housing into an ambient environment.

6. The apparatus of claim 4, wherein the housing and the cover are constructed of a high-density molded plastic material.

7. The apparatus of claim 4, and further comprising a mechanism for securing the housing to an external structure.

8. The apparatus of claim 1 and further comprising:
   a battery powered resistive heater located within the housing and spaced from the actuator system, the battery powered resistive heater configured to receive signals from the hand-held remote control to activate or deactivate the battery powered resistive heater.

9. A method of remotely dispersing of an attractant or repellent in a controlled manner from a first aerosol container or a second aerosol container having a different height than the first aerosol container, the method comprising:

providing a removable base support configured to be positioned within the housing, the base support comprising:

a first upper surface configured to accept a bottom of the first aerosol container;

a second upper surface of a selected distance above the first surface, the second upper surface configured to accept a bottom of the second aerosol container, the first aerosol container having a height greater than the second aerosol container; and an upwardly extending member having opposing first and second concave surfaces, the first concave surface configured to abut a vertical surface of the first aerosol container and the second concave surface configured to abut a vertical surface of the second aerosol container;

positioning the removable base support in a housing such that the valve of either the first aerosol container of the second aerosol container is aligned with an actuator system in the container, wherein the actuator system comprises an actuator;

transmitting a first signal from a hand-held remote control to a receiver positioned on the housing, the receiver in communication with the actuator system;

manipulating the actuator system to open or close the valve on the container; and dispersing the contents of the container while the first signal is received.

10. The method of claim 9, and mounting the housing in an outdoor environment.

11. The method of claim 9, wherein manipulating the actuator assembly comprises moving the actuator to directly open or close the valve of the first or second aerosol container.

12. The method of claim 9, wherein manipulating the actuator assembly comprises moving the actuator to pivot a lever about a fulcrum which opens or closes the valve of the first or second aerosol container utilizing a mechanical advantage from a force provided by the actuator.

13. The method of claim 9, and further comprising:

providing a heater within the housing, the heater spaced from the actuator and being configured to receive signals from the hand held remote control to activate or deactivate the heater.

14. A remote controlled apparatus for dispersing attractant or repellent from a first aerosol container or a second aerosol container having a different height than the first aerosol container, each of the first and second aerosol containers having a spray valve, the apparatus comprising:

a housing;

a removable base support configured to be positioned within the housing, the base support comprising:

a first upper surface configured to accept a bottom of a first aerosol container;

a second upper surface a selected distance above the first surface, the second upper surface configured to accent a bottom of a second aerosol container, the first aerosol container having a height greater than the second aerosol container; and an upwardly extending member having opposing first and second concave surfaces, the first concave surface configured to abut a vertical surface of the first aerosol container and the second concave surface configured to abut a vertical surface of the second aerosol container;

an actuator system secured to the housing, the actuator system comprising:

a lever having a length extending from a first end to a second end;

an actuator in communication with the lever proximate the first end; and wherein the valve is in communication with the lever proximate the second end, wherein the lever utilizes a fulcrum to provide a mechanical advantage in engaging the valve either the first aerosol container or the second aerosol container relative to a force imparted on the lever by the actuator;

a battery powered hand-held remote control device configured to send a first signal;

a receiver configured to receive the first signal from the hand-held remote control device and wherein the receiver is in communication the actuator, where the first signal from the receiver causes the actuator to move, which in turn moves the lever and causes the spray valve of either the first aerosol container or the second aerosol container to open or shut utilizing the mechanical advantage.

15. The apparatus of claim 14, wherein the housing comprises a cover, wherein the cover has an aperture positioned about a nozzle of the spray valve to allow the attractant or repellent within the container to be dispersed from the housing into an ambient environment.

16. The apparatus of claim 14, and further comprising a mechanism for securing the housing to an external structure.

17. The apparatus of claim 14 and further comprising:

a battery powered resistive heater located within the housing and spaced from the actuator, the battery powered resistive heater configured to receive a signal from the hand-held remote control device to activate or deactivate the battery powered resistive heater.

* * * * *